(12) United States Patent
Ohta et al.

(10) Patent No.: US 8,066,253 B2
(45) Date of Patent: Nov. 29, 2011

(54) FORMATION OF FOAMED RESIN ARTICLE

(75) Inventors: Masato Ohta, Yokohama (JP); Teruo Iwai, Yokohama (JP); Masaya Hiramatsu, Ageo (JP)

(73) Assignee: Bridgestone Corporation, Tokyo (JP)

( * ) Notice: Subject to any disclaimer, the term of this patent is extended or adjusted under 35 U.S.C. 154(b) by 1126 days.

(21) Appl. No.: 11/144,018

(22) Filed: Jun. 3, 2005

(65) Prior Publication Data
US 2005/0269724 A1   Dec. 8, 2005

Related U.S. Application Data

(63) Continuation of application No. PCT/JP03/015581, filed on Dec. 5, 2003.

(30) Foreign Application Priority Data

Dec. 12, 2002  (JP) .................. 2002-360964
Dec. 12, 2002  (JP) .................. 2002-360965
Dec. 12, 2002  (JP) .................. 2002-360966
Dec. 12, 2002  (JP) .................. 2002-360967
Dec. 12, 2002  (JP) .................. 2002-360968

(51) Int. Cl.
*B28B 5/00* (2006.01)
(52) U.S. Cl. ......... 249/85; 24/697.1; 24/701; 211/87.01
(58) Field of Classification Search ............... 428/583; 249/85; 24/324, 666, 697.1, 701; 248/220.21, 248/220.22, 224.8, 221.12, 221.11; 403/353; 411/522; 211/88.01, 88.04, 90.01, 106.01, 211/87.01, 86.01, 192
See application file for complete search history.

(56) References Cited

U.S. PATENT DOCUMENTS

| 2,656,617 | A | * | 10/1953 | Composto ............ 434/343 |
| 4,778,067 | A | * | 10/1988 | Bellerose .............. 211/187 |
| 4,932,105 | A | * | 6/1990 | Muller ..................... 24/666 |
| 6,026,761 | A | * | 2/2000 | Parniske et al. ........ 114/343 |
| 6,113,131 | A | * | 9/2000 | Uehara et al. .......... 280/728.3 |
| 6,202,862 | B1 | * | 3/2001 | Acquaviva et al. ..... 211/69.5 |

(Continued)

FOREIGN PATENT DOCUMENTS

DE   2007430   9/1971

(Continued)

OTHER PUBLICATIONS

Chinese Office Action dated Aug. 17, 2007.

(Continued)

*Primary Examiner* — Yogendra Gupta
*Assistant Examiner* — Ninh Le
(74) *Attorney, Agent, or Firm* — Sughrue Mion, PLLC

(57) ABSTRACT

An embedment member of a foamed resin article such as a seat pad formed in a mold. The mold is provided with engaging projections and a pocket portion formed in or on an inner surface of a core thereof. A surface of the embedment member is positioned to face the core and the surface is superposed onto the surface of the core such that the projections enter into large opening portions. Then, the embedment member is slid in such a manner as to introduce the projections into narrow portions and wide portions, thereby retaining the embedment member to the core. In this state, an end portion of the embedment member is fitted into the pocket portion. To release the foamed resin article from the mold, the foamed resin article is slid in a direction opposite to the direction of the aforementioned sliding.

6 Claims, 9 Drawing Sheets

U.S. PATENT DOCUMENTS

| | | | |
|---|---|---|---|
| 6,888,362 B2 * | 5/2005 | Eldridge et al. | 324/757 |
| 2002/0043041 A1 * | 4/2002 | Yoyasu | 52/716.5 |
| 2002/0139081 A1 * | 10/2002 | Nada et al. | 52/716.5 |

FOREIGN PATENT DOCUMENTS

| | | |
|---|---|---|
| DE | 4021354 | 1/1992 |
| JP | 60-145814 A | 8/1985 |
| JP | 61-110516 A | 5/1986 |
| JP | 61-37101 B2 | 8/1986 |
| JP | 1-306230 A | 12/1989 |
| JP | 4-137952 A | 12/1992 |
| JP | 5-116148 A | 5/1993 |
| JP | 5-54806 U | 7/1993 |
| JP | 07-038270 A | 2/1995 |
| JP | 8-80536 A | 3/1996 |
| JP | 8-174564 A | 7/1996 |
| JP | 9-201831 A | 8/1997 |
| JP | 11-192628 A | 7/1999 |
| JP | 2001-170948 A | 6/2001 |

OTHER PUBLICATIONS

International Search Report.
Supplementary European Search Report dated Sep. 21, 2009.
Canadian Office Action dated Oct. 5, 2010 in Canadian Application No. 2,508,448.

* cited by examiner

FORMATION OF FOAMED RESIN ARTICLE

CROSS REFERENCE TO RELATED APPLICATION

This is a continuation application of PCT/JP03/15581 filed on Dec. 5, 2003.

FIELD OF THE INVENTION

The present invention relates to a method of forming a foamed resin article such as a seat pad for an automobile seat and, particularly, to a method of forming a foamed resin article in which an embedment member and a resin foam are integrated.

The present invention relates to a method of releasing a foamed resin article such as a seat pad of an automobile seat from a mold after foaming and, particularly, to a method of releasing a foamed resin article in which an embedment member and a resin foam are integrated.

The present invention relates to an embedment member to be integrated with a resin foam when a seat pad for a seat of an automobile or the like is produced by foaming. More particularly, the present invention relates to an embedment member attached to an inner surface of a mold for forming the seat pad.

BACKGROUND OF THE INVENTION

A seat pad for an automobile is formed by foaming an expandable resin material such as urethane in a mold. A resin foam made of the expandable urethane composes a body of the seat pad. On the back or the inside of the seat pad body, a member (an embedment member) such as a member for controlling the sitting comfort (for example, a member for controlling the hardness or the holding property) is integrally provided.

The embedment member of the seat pad is generally attached to a core of the mold so that the embedment member is integrated by foaming of the resin such as urethane.

A conventional example of the method of forming a foamed resin article will be described with reference to FIGS. 5 through 8.

As shown in FIGS. 5 through 7, a mold (metal mold) comprises a lower mold half 1, an upper mold half 2, and a core 3 attached to the upper mold half 2. The upper mold half 2 is pivotable about a pivot (not shown) upwardly and downwardly as shown in FIG. 7. The core 3 is provided with a pin-like projection 4 at such a position that the projection 4 projects downwardly when the upper mold half 2 is clamped.

To form a seat pad using this mold, a seat pad embedment member 5 is attached to and skewered with the projection 4 and an predetermined amount of expandable resin material such as urethane liquid is supplied into the lower mold half 1. After that, the upper mold half 2 is clamped (FIG. 5) and the resin is foamed (FIG. 6). After the resin foam is cured, the upper mold half 2 is pivotally moved to stand vertically as shown in FIG. 7 and a seat pad 7 in which a seat pad body 6 composed of the resin foam and the seat pad embedment member 5 are integrated is released from the mold. After taking out the seat pad 7, another seat pad embedment member 5 is skewered with the pin-like projection 4 while the upper mold half 2 is kept in the standing state, thereby serving the forming process for another seat pad.

FIG. 8 is a vertical sectional view of the seat pad 7 thus formed in which the left side of this drawing is the front side of the seat.

It is well known in the art to from a seat pad by foaming with a mold as shown in JP S61-37101B.

In the forming method shown in FIGS. 5 through 7, the formed seat pad 7 must be released from the mold in a substantially horizontal direction (in the leftward direction of FIG. 7) H. This is because the seat pad embedment member 5 is skewered with the pin-like projection 4 so that it is impossible to release the seat pad 7 from the mold in the upward direction (direction Z) of FIG. 7. It should be noted that the direction Z is a direction toward the front side of the seat for the seat pad 7.

For releasing the seat pad 7 from the mold in the direction H, it is required to jerk a front lower portion 6a (FIG. 8) of the seat pad body 6 off the core 3. If it is possible to release the seat pad from the mold in the direction Z, such jerking operation is not required, thus facilitating the releasing operation.

SUMMARY OF THE INVENTION

I. The first object of the present invention is to provide a method of forming a foamed resin article such as a seat pad with an embedment member from a mold, in which the foamed resin article can be released from the mold by sliding the formed resin article along the inner surface of the mold.

A method of forming a foamed resin article according to the first aspect of the present invention has: attaching an embedment member to an inner surface of a mold; foaming a resin material in the mold so as to integrate the embedment member with a thus formed resin foam; and then releasing the article thus formed from the mold. The embedment member is attached to the mold by sliding the embedment member along the inner surface of the mold. A pocket portion for receiving an end portion of the embedment member is formed on the inner surface of the mold and the end portion of the embedment member is fitted into the pocket portion according to said sliding of the embedment member.

According to the method of forming a foamed resin article, the embedment member can be separated from the inner surface of the mold by sliding the embedment member along the inner surface of the mold so that the embedment member comes off the pocket portion. Therefore, the foamed resin article can be released from the mold by sliding the foamed resin article along the inner surface of the mold.

Therefore, when the foamed resin article is a seat pad, the seat pad can be released from the mold in a direction toward the front side of the seat. In the present invention, it is preferable that the embedment member is provided with a concave portion which is adapted to be engaged with an engaging projection formed on the inner surface of the mold to hold the embedment member to the inner surface of the mold, that the engaging projection has a thin leg and an enlarged head, that the concave portion has a narrow portion to be engaged with the leg, a wide portion to be engaged with the head, and a large opening portion for allowing the passage of the head, and that the head is inserted into the large opening portion and said sliding of the embedment member is conducted so that the engaging projection enters into the narrow portion and the wide portion from the large opening portion, thereby attaching the embedment member to the inner surface of the mold.

According to this aspect, the end portion of the embedment member is fitted in the pocket portion while the head of the engaging projection is introduced from the large opening portion to the wide portion, thereby securely holding the embedment member to the mold. To release the embedment member, the embedment member is slid along the inner surface of the mold so as to introduce the head to the large opening portion and to simultaneously withdraw the end portion of the embedment member from the pocket portion.

It is preferable that the narrow portion and the wide portion linearly extend from the large opening portion.

In the first aspect, a plurality of concave portions are provided, thereby stabilizing the attachment of the embedment member to the mold. In this case, it is preferable that the directions in which the narrow portions and the wide portions extend from the large opening portions of the respective concave portions lie on a straight line and are the same as each other. This structure allows the embedment member to be linearly slid so as to attach the embedment member to the mold and also allows the foamed resin article to be linearly slid so as to release the foamed resin article from the mold.

A mold of the present invention for forming a foamed resin article has an embedment member integrated therewith. The mold has a pocket portion, formed on an inner surface thereof, to which an end portion of the embedment member is fitted for holding the embedment member to the inner surface.

It is preferable that the pocket portion has a pair of side plates projecting from the inner surface of the mold and a front plate connecting the side plates.

II. The second object of the present invention is to provide a method of forming a foamed resin article such as a seat pad with an embedment member, in which the foamed resin article can be released from a mold by sliding the formed resin article along the inner surface of the mold.

A method of forming a foamed resin article according to the second aspect of the present invention has: attaching an embedment member to an inner surface of a mold; foaming a resin material in the mold so as to integrate the embedment member with a thus formed resin foam; and then releasing the article thus formed from the mold. The embedment member is attached such that the embedment member is allowed to be separated from the mold by sliding the embedment member along the inner surface of the mold. The foamed resin article is released from the mold by sliding the foamed resin article in the direction of the aforementioned sliding of the embedment member.

According to the method of forming a foamed resin article, the embedment member can be separated from the inner surface of the mold by sliding the embedment member along the inner surface of the mold so that the foamed resin article can be released from the mold by sliding the foamed resin article along the inner surface of the mold.

Therefore, when the foamed resin article is a seat pad, the seat pad can be released from the mold in a direction toward the front side of the seat.

In one embodiment of the second aspect, the embedment member may have a concave portion which is adapted to be engaged with an engaging projection formed on the inner surface of the mold to hold the embedment member to the inner surface of the mold. The engaging projection may have a thin leg and an enlarged head. The concave portion may have a narrow portion to be engaged with the leg, a wide portion to be engaged with the head, and a large opening portion for allowing the passage of the head.

According to the embodiment, the head of the engaging projection is introduced from the large opening portion to the wide portion, thereby attaching the embedment member to the mold. To release the embedment member, the embedment member is slid along the inner surface of the mold so as to introduce the head to the large opening portion, thereby separating the seat pad embedment member from the inner surface of the mold.

It is preferable that the narrow portion and the wide portion linearly extend from the large opening portion.

In the second aspect, a plurality of concave portions are provided, thereby stabilizing the attachment of the embedment member to the mold. In this case, it is preferable that the directions in which the narrow portions and the wide portions extend from the large opening portions of the respective concave portions lie on a straight line or are in parallel to each other and are the same as each other. This structure allows the foamed resin article to be linearly slid so as to release the foamed resin article from the mold.

III. The third object of the present invention is to provide an embedment member which allows a seat pad with the embedment member to be released from a mold in a direction toward a front side of the seat in case that the mold is provided with a projection for retaining the embedment member.

An embedment member of the third aspect of the present invention is adapted to be attached to an inner surface of a mold for forming a seat pad by foaming and to be integrated with the resin foam when a resin material is foamed in the mold. The embedment member is provided with a concave portion which is adapted to be engaged with an engaging projection formed on the inner surface of the mold to hold the embedment member to the inner surface of the mold. The engaging projection has a thin leg and an enlarged head. The concave portion has a narrow portion to be engaged with the leg, a wide portion to be engaged with the head, and a passage portion for the passage of the head.

The embedment member can be attached to the mold by introducing the head of the engaging projection from the passage portion to the wide portion. To release the seat pad from the mold, the embedment member is slid along the inner surface of the mold to introduce the head to the passage portion, thereby separating the embedment member from the inner surface of the mold. Therefore, the seat pad can be released from the mold in a direction toward the front side of the seat.

In the third aspect, it is preferable that the concave portion has a large opening portion as the passage portion which is larger than the head, and the narrow portion and the wide portion extend from the large opening portion. According to the large opening portion, the embedment member can be attached to the mold just by inserting the enlarged head of the engaging projection into the large opening portion and sliding the embedment member, while the embedment member can be separated from the mold by sliding the embedment member in the opposite direction to introduce the head to the large opening portion.

The large opening portion preferably has a taper portion in which the width is gradually reduced toward the narrow portion and the wide portion. As the head of the projection is inserted into the large opening portion and the embedment member is slid, the projection is smoothly introduced to the narrow portion and the wide portion because the projection is guided by the taper portion.

It is preferable that the narrow portion and the wide portion linearly extend from the large opening portion.

In the third aspect, a plurality of concave portions are provided, thereby stabilizing the attachment of the embedment member to the mold. In this case, it is preferable that the directions in which the narrow portions and the wide portions extend from the large opening portions of the respective concave portions lie on a straight line or are in parallel to each other and are the same as each other.

IV. The seat pad embedment member 5 is skewered with the pin-like projection 4 in the aforementioned forming method shown in FIGS. 5 through 7, but the position of the embedment member is easily shifted from the correct position. The fourth object of the present invention is to provide a method of forming a foamed resin article with an embedment member in which positional tolerance of the embedment member is small and to provide a mold for carrying out this method.

A method of forming a foamed resin article of the fourth aspect has: attaching an embedment member to an inner surface of a mold; foaming a resin material in the mold so as to integrate the embedment member with a thus formed resin foam; and then releasing the article thus formed from the mold and is characterized in that the mold is provided with a mark for positioning the embedment member so that the embedment member is attached to the mold with reference to the mark.

A mold of the fourth aspect for forming a foamed resin article has an embedment member integrated therewith. The mold has a mark indicating the mounting position of the embedment member.

According to the mold and the method of forming a foamed resin article, the positional tolerance of the embedment member can be significantly reduced by attaching the embedment member to the mold with reference to the mark on the mold.

In the method of the fourth aspect, it is preferable that the embedment member is provided with a mark so that the mark is used to be collated with the mark on the mold.

The method of the fourth aspect is suitably adopted to a case in which the embedment member is attached to the mold by sliding the embedment member along the inner surface of the mold. This structure allows the foamed resin article to be released from the mold by sliding the foamed resin article along the inner surface of the mold. Therefore, when the foamed resin article is a seat pad, the seat pad can be released from the mold in a direction toward the front side of the seat.

In one embodiment of the fourth aspect, the embedment member may have a concave portion which is adapted to be engaged with an engaging projection formed on the inner surface of the mold to hold the embedment member to the inner surface of the mold. The engaging projection may have a thin leg and an enlarged head. The concave portion may have a narrow portion to be engaged with the leg, a wide portion to be engaged with the head, and a large opening portion for allowing the passage of the head.

According to the embodiment, the embedment member is attached to the mold by introducing the head of the engaging projection from the large opening portion to the wide portion.

It is preferable that the narrow portion and the wide portion linearly extend from the large opening portion.

In the fourth aspect, a plurality of concave portions are provided, thereby stabilizing the attachment of the embedment member to the mold. In this case, it is preferable that the directions in which the narrow portions and the wide portions extend from the large opening portions of the respective concave portions lie on a straight line or are in parallel to each other and are the same as each other. This structure allows the embedment member to be linearly slid so as to attach the embedment member to the inner surface of the mold.

V. The fifth object of the present invention is to provide a foamed resin article with an embedment member in which difference in position of the embedment member can be easily checked and to provide a method of forming the same.

A method of forming a foamed resin article according to the fifth aspect has: attaching an embedment member to an inner surface of a mold; foaming a resin material in the mold so as to integrate the embedment member with a thus formed resin foam; and then releasing the article thus formed from the mold. A mark for indicating the position of the embedment member is formed on the foamed resin article so that the position of the embedment member is checked by comparing the embedment member to the mark on the article after released from the mold.

A foamed resin article of the fifth aspect has an embedment member formed therein, and a mark for checking the position of the embedment member.

According to the foamed resin article and the forming method of the same, difference in position of the embedment member can be easily judged by checking the position of the embedment member with reference to the mark on the article.

In the fifth aspect, it is preferable that the embedment member is provided with a mark which is used to be collated with the mark on the article.

The mark for the embedment member may be provided on each of a plurality of sides extending in different directions, preferably on each of two sides which are perpendicular to each other, of said embedment member. Accordingly, the position of the embedment member can be checked in two cross directions, thereby improving the accuracy of judging the difference in position of the embedment member.

The mark on the article may be composed of a concavity or a convexity and can be formed by a convexity or a concavity formed in or on the inner surface of the mold.

PREFERRED EMBODIMENTS OF THE INVENTION

Preferred Embodiments of the First Through Third Aspects

Figure 1:
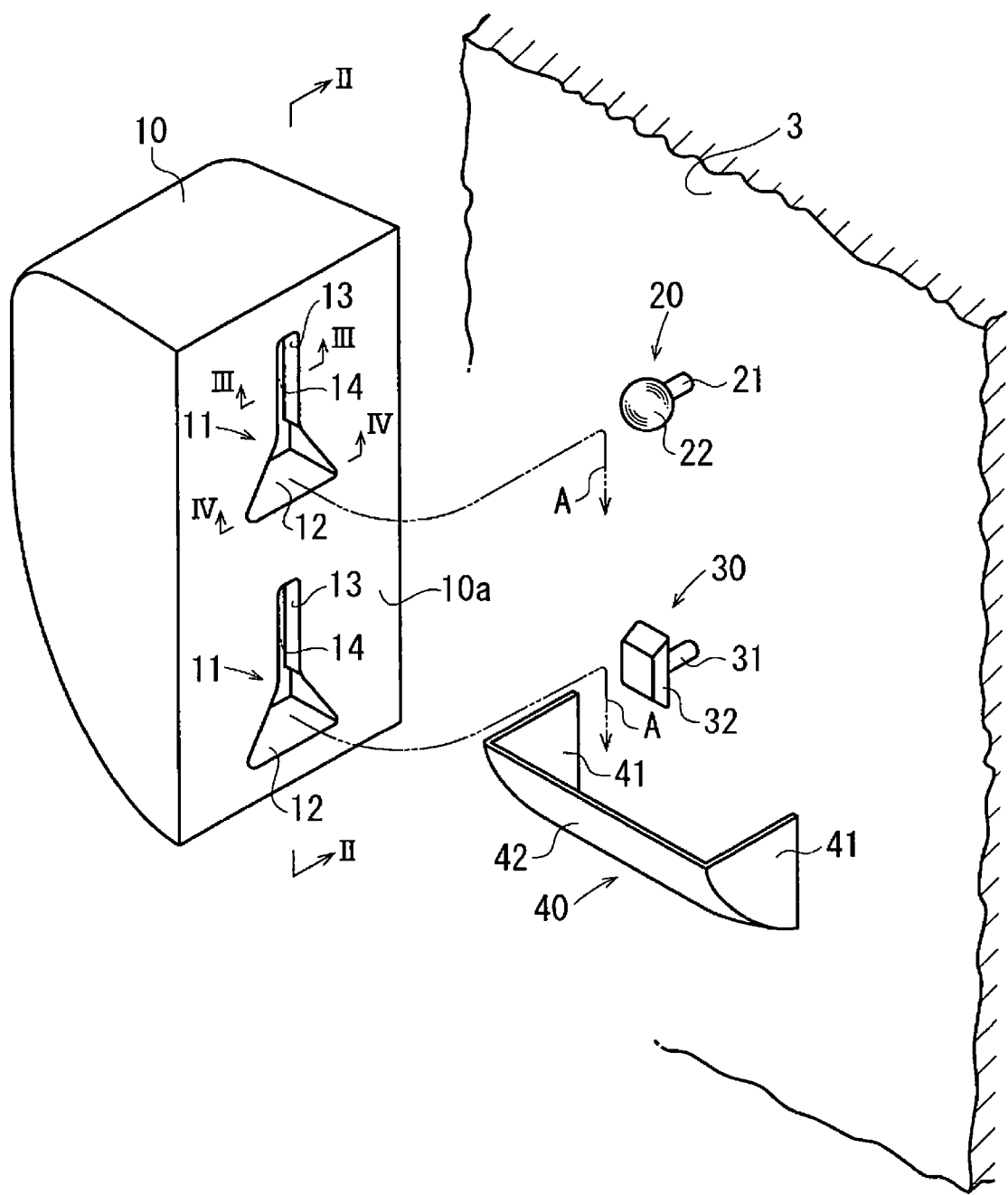
FIG. 1 is a perspective view of an inner surface of a core of a mold for a foamed resin article according to an embodiment.
Figure 2:
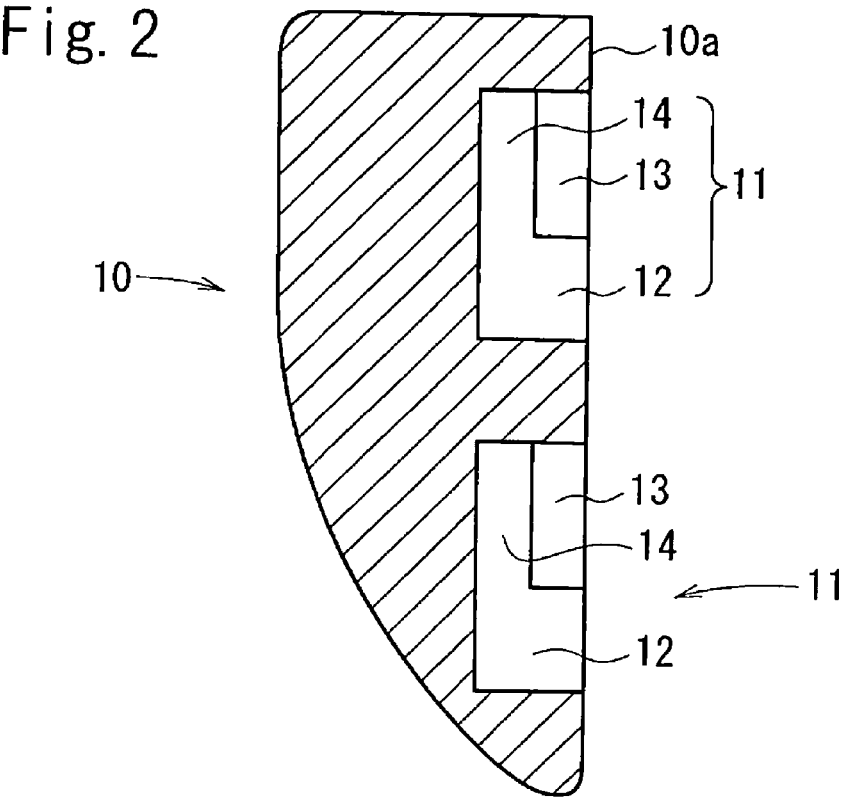
FIG. 2 is a sectional view taken along a line II-II of FIG. 1.
Figure 3:
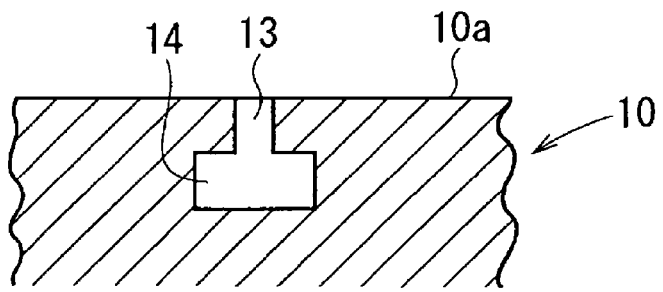
FIG. 3 is a sectional view taken along a line III-III of FIG. 1
Figure 4:
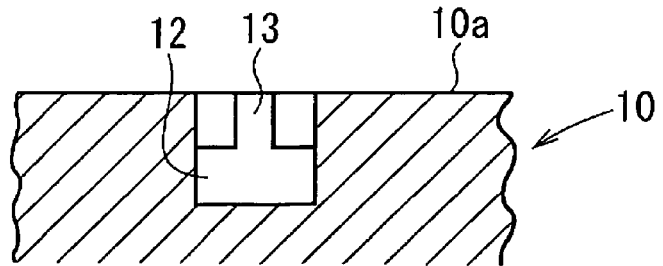
FIG. 4 is a sectional view taken along a line IV-IV of FIG. 1.

FIG. 1 is a perspective view of an inner surface of a core of a mold for a foamed resin article and a seat pad embedment member to be attached to the inner surface of the core according to embodiments of the first through third aspects. FIGS. 2, 3, and 4 are sectional views taken along a line II-II, a line III-III, and a line IV-IV of FIG. 1, respectively.

A seat pad embedment member 10 is provided with two concave portions 11 formed in a surface 10*a* (a first exterior face) to be brought in contact with a core 3. Each concave portion 11 comprises a large opening portion 12, a narrow portion 13 and a wide portion 14 which are continued from the large opening portion 12. The narrow portion 13 is formed in the surface 10*a*, while the wide portion 14 is formed inside the embedment member 10 along the inner side of the narrow portion 13. The narrow portion 13 is positioned at the center in the width direction of the wide portion 14.

In this embodiment, the large opening portion 12 has a triangular prism configuration of which width gradually decreases toward the narrow portion 13 and the wide portion 14.

In each concave portion 11 of this embodiment, the narrow portion 13 and the wide portion 14 extend linearly from the large opening portion 12. The narrow portions 13 and the wide portions 14 of the respective concave portions 11, 11 are aligned along a straight line. The extending directions of the narrow portion 13 and the wide portion 14 are the same as each other.

The core 3 is provided with projections 20, 30 with which the concave portions 11, 11 engage, respectively. The projections 20, 30 have legs 21, 31 of which diameter is small and enlarged heads 22, 33 of which ends are enlarged. The head 22 is spherical and the head 32 is trapezoidal of which sectional area gradually decreases toward the upper end thereof. The distance between the centers of the projections 20, 30 are equal to the distance between the centers of the concave portions 11 and 11.

In this embodiment, the core 3 is provided with a pocket portion 40 on an extension of a line connecting the projections 20 and 30 in a direction from the projection 20 toward the projection 30. The pocket portion 40 comprises a pair of side plates 41, 41, and a front plate 42 connecting the side plates 41, 41. The pocket portion 40 has such a configuration inside thereof as to receive a lower end portion (as seen in the drawing) of the embedment member 10. The thickness of the lower end portion of the embedment member 10 decreases toward the lower end thereof so that the lower end portion can be inserted into the pocket portion 40.

To attach the embedment member 10 to the core 3, the surface 10*a* is positioned to face the core 3 and the surface 10*a* is superposed onto the surface of the core 3 such that the projections 20, 30 enter into the large opening portions 12, 12. Then, the embedment member 10 is slid in a direction of arrow A in such a manner as to introduce the projections 20, 30 into the narrow portions 13 and the wide portions 14 and to fit the end portion of the embedment member 10 into the pocket portion 40.

Accordingly, the legs 21, 31 of the projections 20, 30 are disposed inside the narrow portions 13, 13 and the heads 22, 32 of the projection 20, 30 are disposed inside the wide portions 14, 14. The widths of the heads 22, 32 (the width in the width direction of the narrow portions 13) are larger than the width of the narrow portions 13. The depth of the narrow portions 13 is equal to or slightly larger than the length of the legs 21, 31. The size of the pocket portion 40 is slightly larger than the size of the end portion of the embedment member 10 such that the end portion of the embedment member 10 is fitted with leaving little space therebetween. Therefore, the embedment member 10 is securely attached to the core 3 by the pocket portion 40 and the projections 20, 30. In this state, the end portion of the embedment member 10 is positioned in the pocket portion 40.

Figure 5:
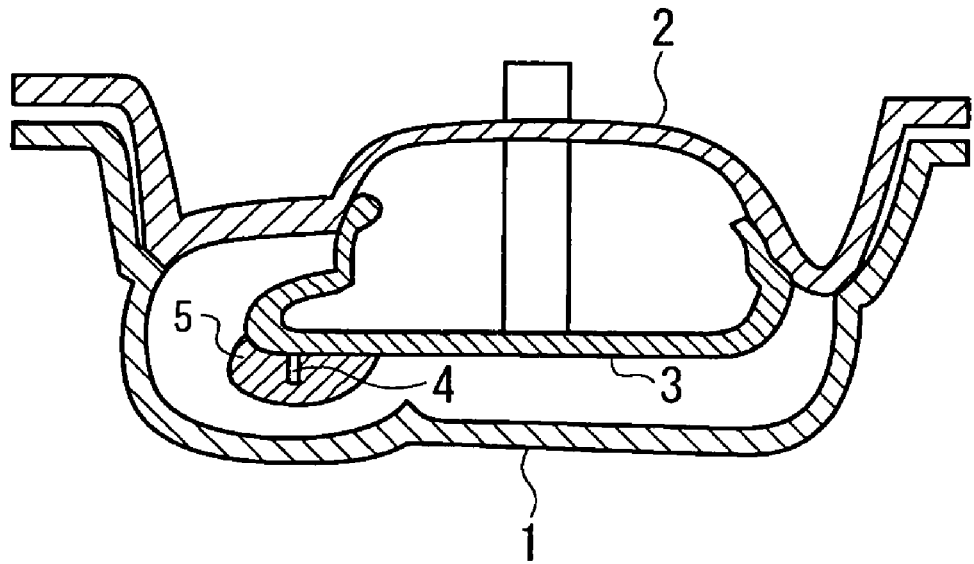
FIG. 5 is a sectional view showing a conventional mold.
Figure 6:
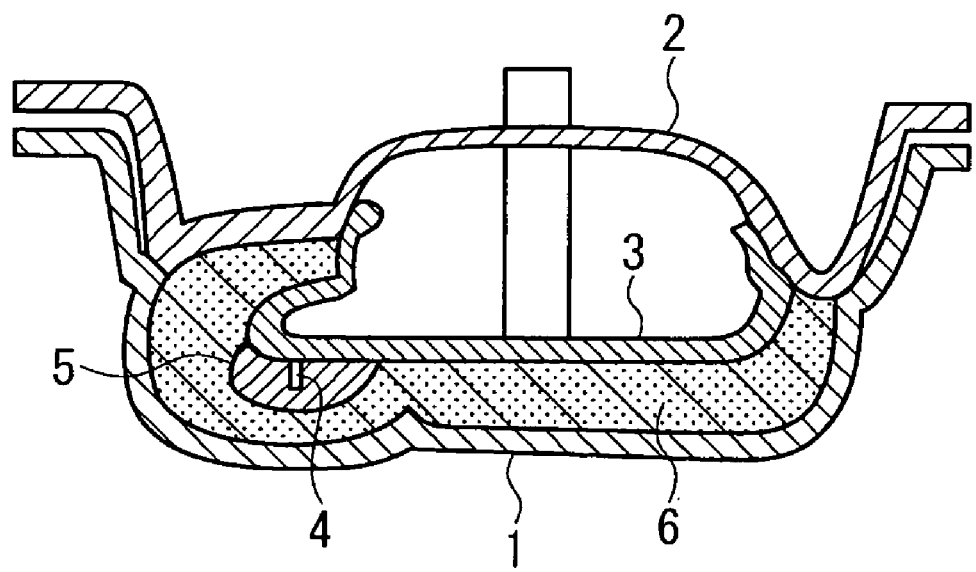
FIG. 6 is a sectional view showing a forming process using the conventional mold.
Figure 7:
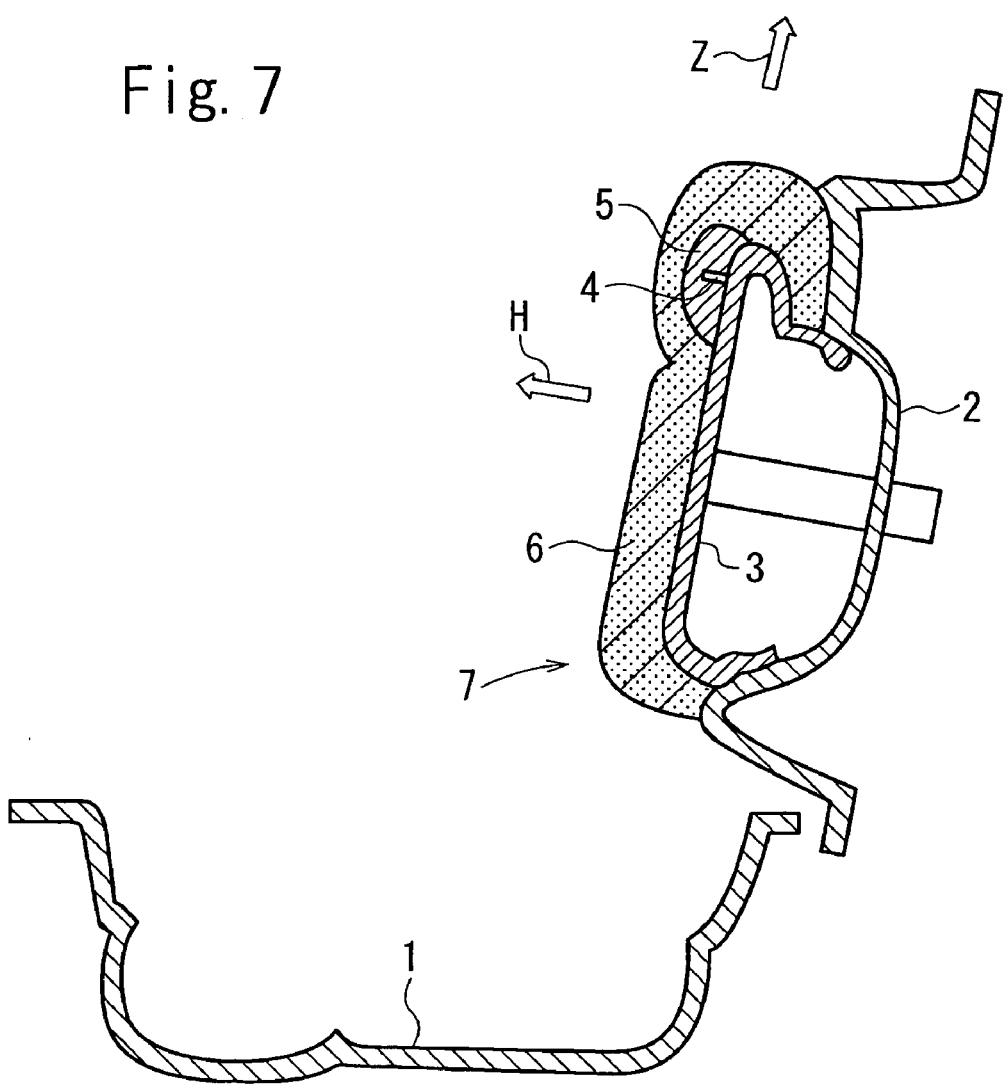
FIG. 7 is a sectional view showing a releasing method in case of the conventional mold.
Figure 8:
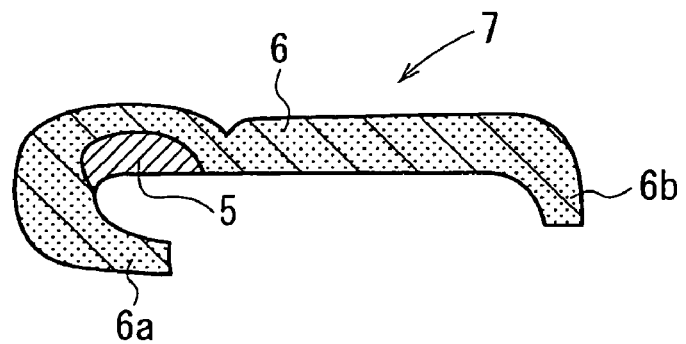
FIG. 8 is a sectional view of a seat pad.

After the embedment member 10 is attached to the core 3, the formation of a seat pad is conducted by foaming resin in the same manner as the aforementioned case shown in FIGS. 5 through 7. After the resin foam is cured, the mold is opened as shown in FIG. 7 and the foamed resin article is released from the mold.

For releasing the foamed resin article from the mold, the seat pad 7 is slid for a predetermined distance in the direction Z in FIG. 7, that is, in a direction toward the front side of the seat. Since the seat pad body 6 is flexible, a rear edge portion 6*b* of the seat pad body 6 is resiliently bent. The "predetermined distance" means such a distance as to allow the end portion of the embedment member 10 to come off the pocket portion 40 and to move the projections 20, 30 from the narrow portions 13 and the wide portions 14 to the large opening portions 12. By this sliding movement, the end portion of the embedment member 10 is released from the pocket portion 40.

After the sliding movement, the seat pad 7 is slightly moved away from the core 3 in the direction H. Therefore, the projections 20, 30 come off the large opening portions 12, 12. During this, the front lower edge 6*a* of the seat pad body 6 is resiliently bent. After that, the seat pad 7 is slid in the direction Z, thereby releasing the seat pad 7 from the mold.

According to this embodiment, the seat pad 7 can be released from the mold in the direction Z just by slightly moving the seat pad 7 in the direction H during the releasing action. That is, the release of the seat pad can be achieved substantially just by sliding the seat pad along the inner surface of the core 3.

The aforementioned embodiment is an example of the present invention. The present invention may be adopted to another embodiment other than the illustrated embodiment. For example, though the narrow portions 13 and the wide portions 14 of the respective concave portions 11, 11 are aligned along a straight line in the aforementioned embodiment, the concave portions 11, 11 may be disposed such that the narrow portions 13 and the wide portions 14 are in parallel and in the same direction. In this case, the projections 20, 30 are aligned abreast with each other as seen in FIG. 1.

Though the large opening portion 12 has a triangular prism configuration in the aforementioned embodiment, the large opening portion 12 may have a trapezoidal prism configuration or the like. The present invention is suitably adopted to a method of forming a seat pad for an automobile. In this case, the working efficiency for releasing a mold is improved, thereby improving the productivity of seat pads for automobiles. However, the present invention can be also suitably adopted to a method of releasing a foamed resin article other than seat pads for automobiles.

Though the two concave portions 11 of the same configuration are formed in the embedment member 10 in the aforementioned embodiment, the lower concave portion 11 in FIG. 1 may have a configuration not to restrain the movement of the embedment member 10 in a direction apart from the core 3. That is, since the embedment member 10 is prevented from moving a part from the core 3 by the projection 20 and the pocket portion 40, the engagement between the lower concave portion 11 and the projection 30 may not restrain the movement of the embedment member 10 in the direction apart from the core 3.

As mentioned above, the present invention enables a foamed resin article to be released from a mold by sliding the foamed resin article along an inner surface of the mold, thereby significantly improving forming workability.

According to the third aspect, a seat pad can be released from a mold in a direction toward the front side of the seat, thereby significantly improving releasing workability.

A Preferred Embodiment of the Fourth Aspect

Figure 9:
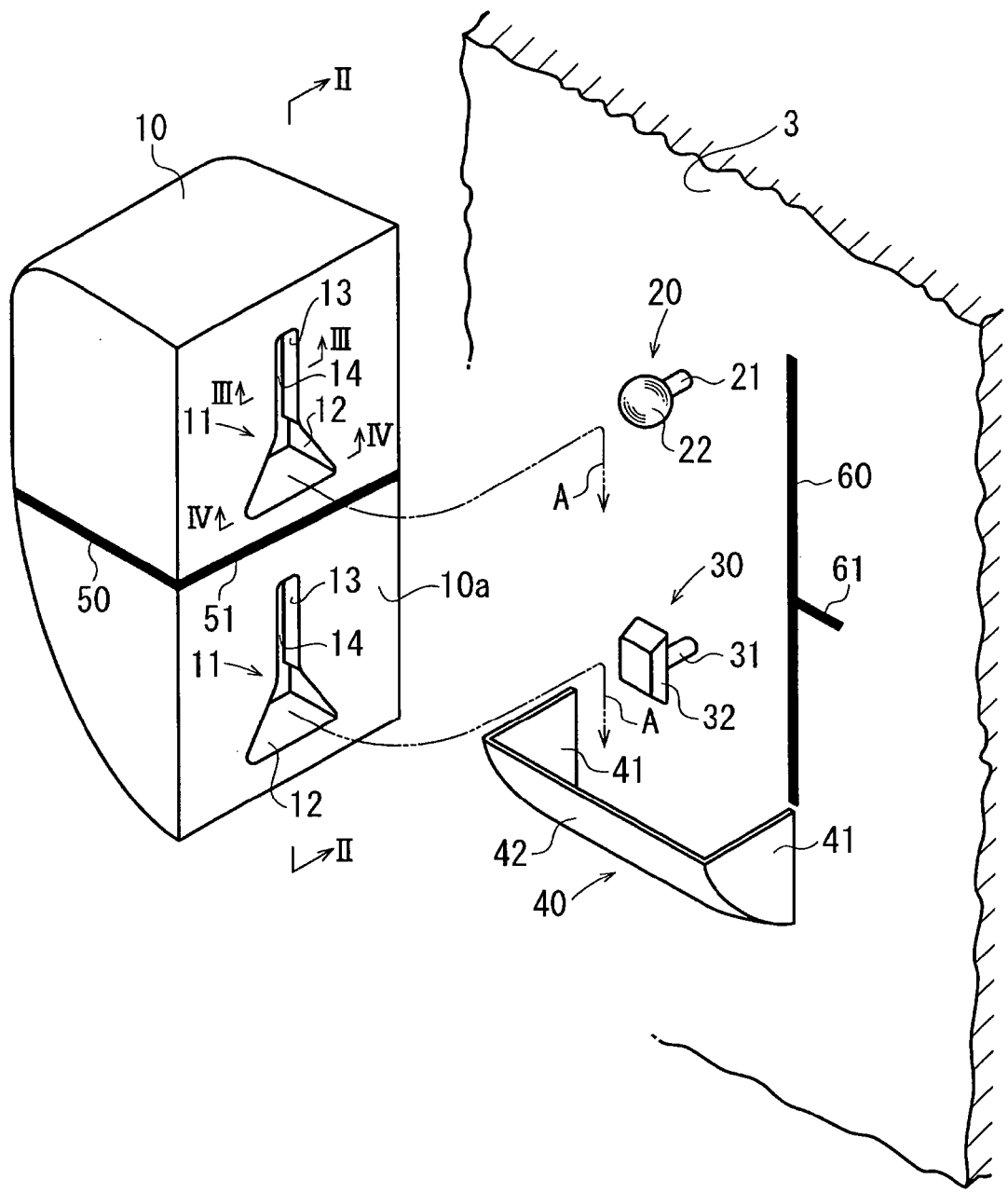
FIG. 9 is a perspective view of an inner surface of a core of a mold according to another embodiment.
Figure 10:
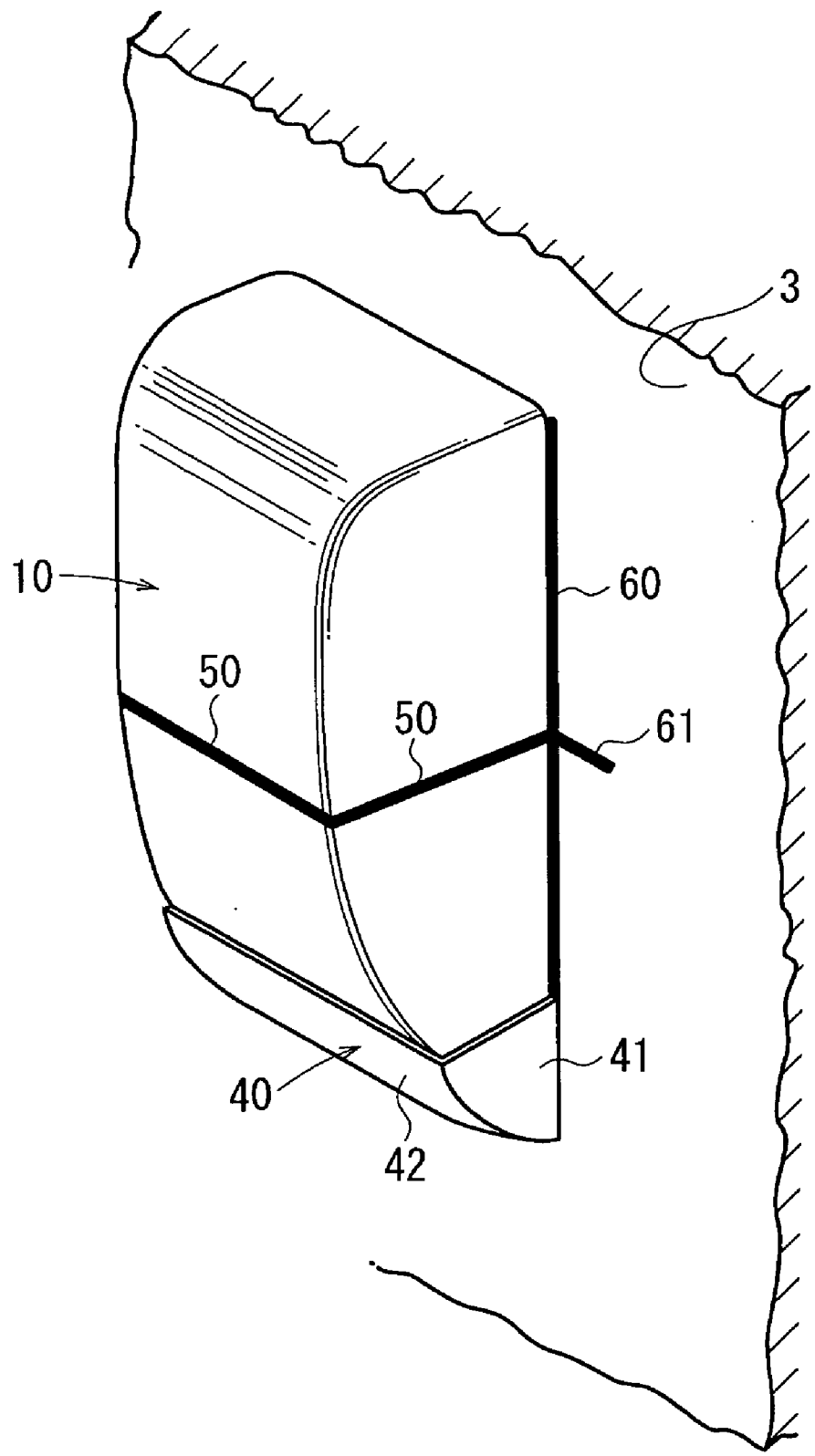
FIG. 10 is a perspective view of the inner surface of the core shown in FIG. 9 in a state that an embedment member is attached.

FIG. 9 is a perspective view of an inner surface of a core of a mold and a seat pad embedment member according to the fourth aspect. FIG. 10 is a perspective view showing a state that the embedment member is attached to the inner surface of the core.

An embedment member 10 is provided on its side surface with a mark 50 for positioning the embedment member 10 during attachment. The mark 50 comprises a straight belt line extending in a direction perpendicular to the back surface 10a of the embedment member 10 and having a thin width (for example, 0.5-10 mm in width). In this embodiment, the mark 50 also extends on the front surface of the embedment member 10.

The inner surface of the core 3 is provided with a linear mark 60 for positioning the side edge of the back surface 10a of the embedment member 10 to extend along this mark 60 and with a mark 61 for positioning the mark 50 to coincide with this mark 61. The mark 61 is a band-like short line extending in a direction perpendicular to the mark 60 from the middle in the longitudinal direction of the mark 60. The mark 60 extends in the extension direction of one of side plates 41 of the pocket portion 40. In this embodiment, the back surface 10a is also provided with a mark 51. The mark 51 extends in the extension direction of the mark 50.

The other structure of the embodiment shown in FIGS. 9, 10 is the same as the embodiment shown in FIGS. 1 through 4 so that the same numerals designate the same parts. Sections along a line II-II, a line III-III, and a line IV-IV of FIG. 9 are the same as shown in FIG. 2, FIG. 3, and FIG. 4.

To attach the embedment member 10 to the core 3, the back surface 10a is positioned to face the core 3 such that one of the side edges of the back surface 10a extends along the mark 60 and the back surface 10a is superposed onto the surface of the core 3 such that the projections 20, 30 enter into the large opening portions 12, 12. Then, the embedment member 10 is slid in a direction of arrow A until the mark 50 coincides with the mark 61 so that the projections 20, 30 are introduced into the narrow portions 13 and the wide portions 14. Accordingly, the legs 21, 31 are disposed inside the narrow portions 13, 13 and the heads 22, 32 are disposed inside the wide portions 14, 14, while the end portion of the embedment member 10 is fitted into the pocket portion 40. The widths of the heads 22, 32 (the width in the width direction of the narrow portions 13) are larger than the width of the narrow portions 13. The depth of the narrow portions 13 is equal to or slightly larger than the length of the legs 21, 31. The size of the pocket portion 40 is slightly larger than the size of the end portion of the embedment member 10. Therefore, the embedment member 10 is securely attached to the core 3 by the pocket portion 40 and the projections 20, 30.

Since there is the mark 60, the embedment member 10 can be properly and readily positioned about the width direction—as seen in FIGS. 1 and 2—during the operation for attaching the embedment member 10. After that, the embedment member 10 is slid until the mark 50 coincides with the mark 61, whereby the embedment member 10 can be also properly and readily positioned about the vertical direction—as seen in FIGS. 1 and 2.

After the embedment member 10 is attached to the core 3, the formation of a seat pad is conducted by foaming resin in the same manner as the aforementioned case. After the resin foam is cured, the mold is opened and the foamed resin article is released from the mold.

The aforementioned embodiment is an example of the fourth aspect. The fourth aspect may be adopted to another embodiment other than the illustrated embodiment. For example, though the mark 60 is provided only in the extension direction of one side plate 41 in the aforementioned embodiment, respective marks 60 may be provided both in the extension directions of the both side plates 41, 41.

The mark 61 may be provided at the same level as the upper end—as seen in FIG. 2—of the embedment member 10. In this case, the embedment member 10 is positioned by setting the upper end of the embedment member 10 to be coincident with the mark. It should be noted that the mark 60 may be omitted.

As mentioned above, according to the fourth aspect, the positional tolerance of an embedment member of a foamed resin article with the embedment member can be significantly reduced. According to an embodiment of the fourth aspect, a foamed resin article can be released from a mold by sliding the foamed resin article along the inner surface of the mold.

Preferred Embodiments of the Fifth Aspect

Figure 11:
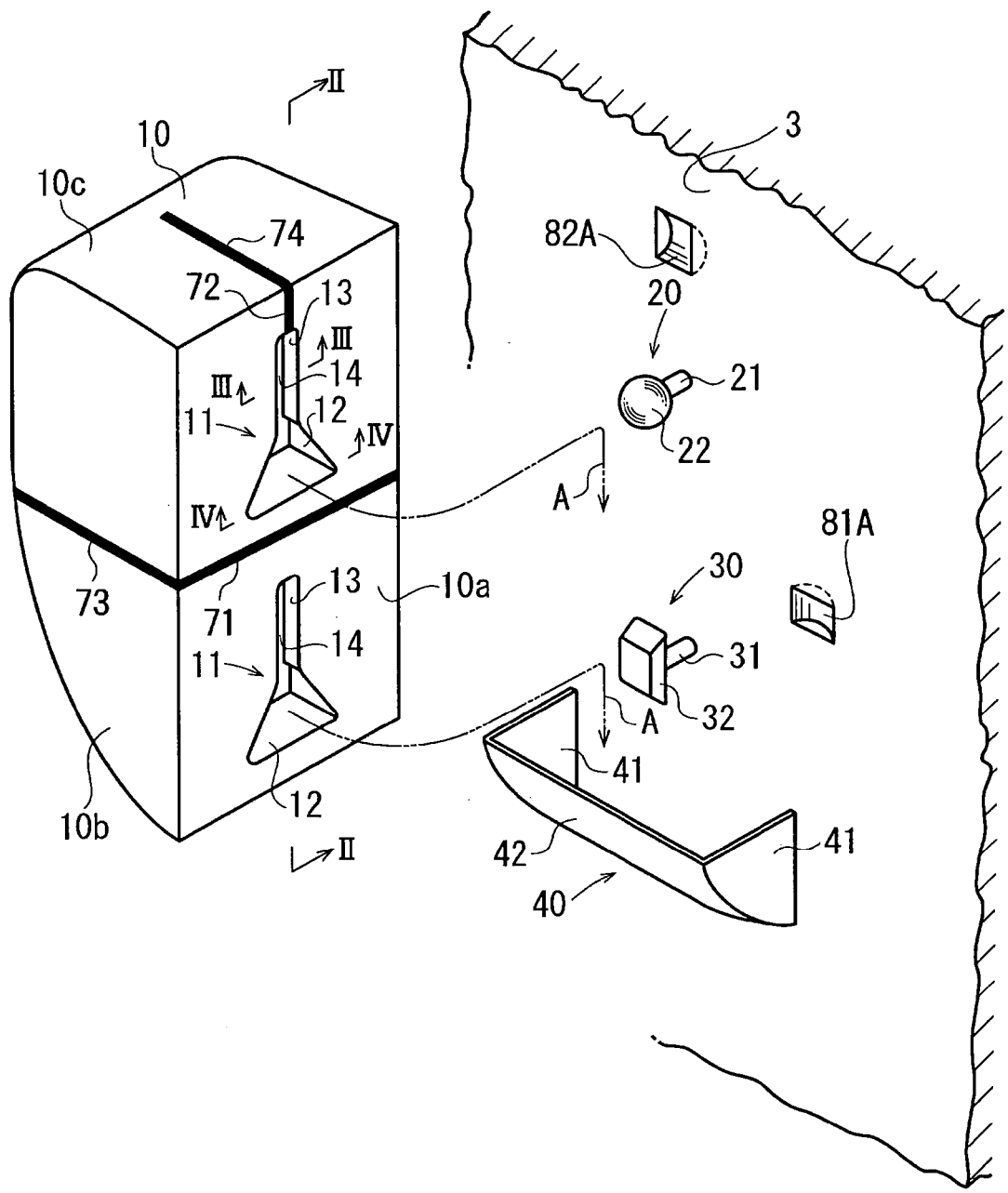
FIG. 11 is a perspective view of an inner surface of a core, illustrating a forming method according to an embodiment of the fifth aspect.
Figure 12:
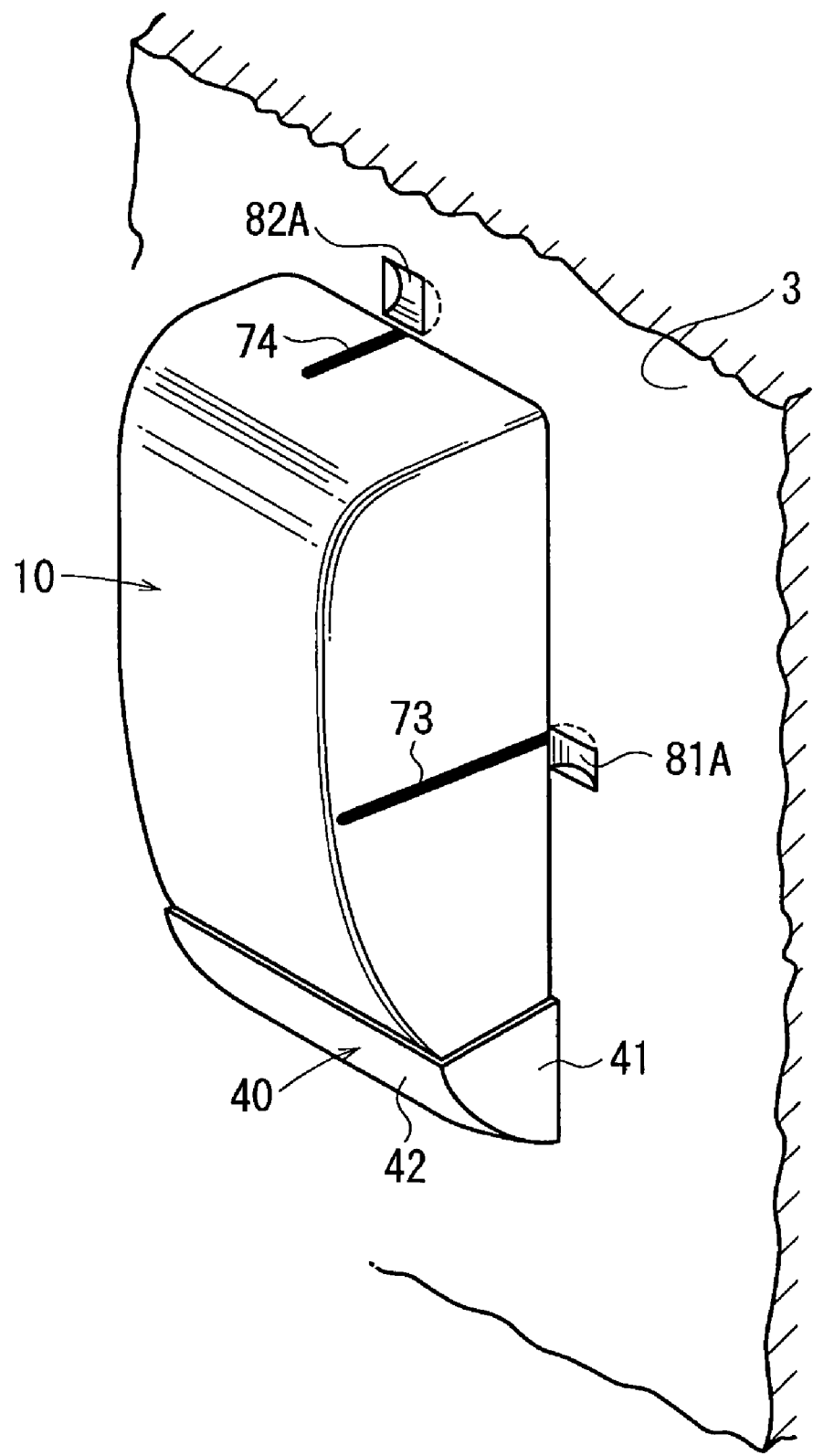
FIG. 12 is a perspective view of the inner surface of the core in a state that an embedment member is attached.
Figure 13A:
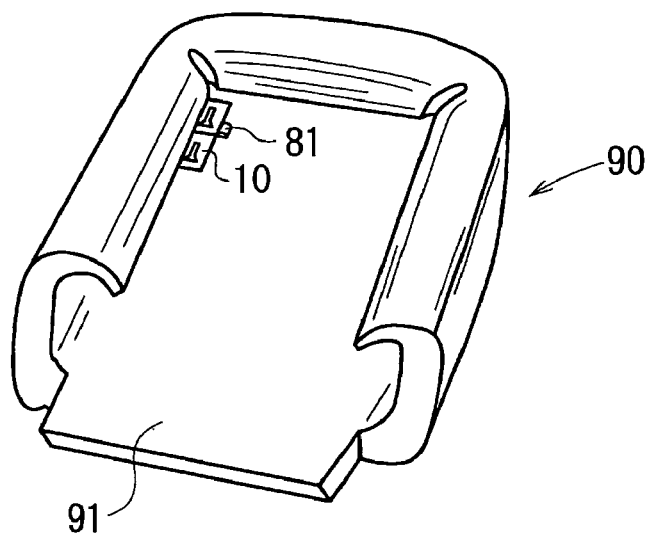
FIG. 13*a* is a perspective view of a seat pad with an embedment member and FIG. 13*b* is a perspective view of a portion near the embedment member shown in FIG. 13*a*.
Figure 13B:
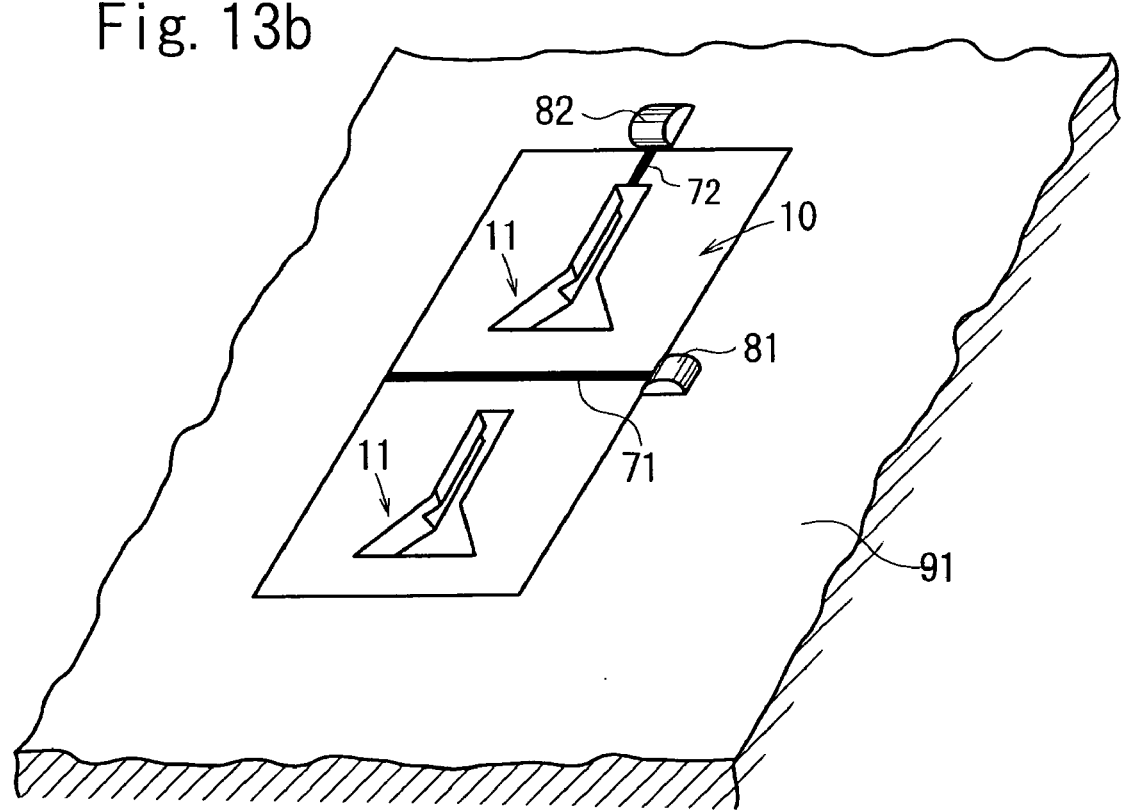

FIG. 11 is a perspective view of an inner surface of a core and a seat pad embedment member, illustrating a forming method according to an embodiment of the fifth aspect, FIG. 12 is a perspective view showing a state that the embedment member is attached to the inner surface of the core, FIG. 13a is a perspective view of a back surface of a formed seat pad, and FIG. 13b is a perspective view of a portion near the embedment member 10 shown in FIG. 13a.

In the embodiment of the fifth aspect, the back 10a of the embedment member 10 is provided with a mark 71 extending in the width direction and a mark 72 extending in a direction perpendicular to the mark 71. The marks 71, 72 comprise band lines having a width, for example, of about 0.5-10 mm, but the width is not limited thereto.

In this embodiment, two side surfaces 10b, 10c of the embedment member 10 perpendicular to each other are provided with marks 73, 74 for positioning the embedment member 10 during attachment. In this embodiment, the marks 71 through 74 extend to the respective corners of the embedment member 10 so that the marks 71 and 73 are continuous with each other across the corner and the marks 72 and 74 are continuous with each other across the corner.

The inner surface of the core 3 is provided with concavities 81A and 82A for forming marks. Marks 81, 82 (shown in FIGS. 13a, 13b) formed by the concavities 81A and 82A are provided for checking whether the embedment member 10 is properly positioned to a predetermined position on the back surface of the formed seat pad. The concavity 81A is positioned on a side of the middle between the projections 20, 30 and the concavity 82A is positioned on an extension of a line connecting the projections 20 and 30 (on a side opposite to the pocket portion 40). The concavities 81A, 82A are formed at such positions as to coincide with the marks 83, 84 when the embedment member 10 is attached to the correct position on the core 3.

The width of the concavities 81A, 82A in the direction parallel to the side edges of the embedment member 10 are larger than the width of the marks 71, 72. The difference between the width of the concavities 81A, 82A and the width of the marks 71, 72 is, for example, in a range of 1-5 mm, but not limited thereto.

The other structure of the embodiment shown in FIGS. 11 through 13b is the same as the embodiment shown in FIGS. 1 through 4 so that the same numerals designate the same parts. Sections along a line II-II, a line III-III, and a line IV-IV of FIG. 11 are the same as shown in FIG. 2, FIG. 3, and FIG. 4.

To attach the embedment member 10 to the core 3, the back surface 10a is positioned to face the core 3 and the back surface 10a is superposed onto the surface of the core 3 such that the projections 20, 30 enter into the large opening portions 12, 12. Then, the embedment member 10 is slid in a direction of arrow A until the mark 73 coincides with the concavity 81A so that the projections 20, 30 are introduced into the narrow portions 13 and the wide portions 14. Accordingly, the legs 21, 31 are disposed inside the narrow portions 13, 13 and the heads 22, 32 are disposed inside the wide portions 14, 14, while the end portion of the embedment member 10 is fitted into the pocket portion 40. The widths of the heads 22, 32 (the width in the width direction of the narrow portions 13) are larger than the width of the narrow portions 13. The depth of the narrow portions 13 is equal to or slightly larger than the length of the legs 21, 31. The size of the pocket portion 40 is slightly larger than the size of the end portion of the embedment member 10. Therefore, the embedment member 10 is securely attached to the core 3 by the pocket portion 40 and the projections 20, 30.

Since there are the marks 73, 74 and the concavities 81A, 82A, the embedment member 10 can be properly and readily positioned about the vertical direction and the lateral direction—as seen in FIGS. 11 and 12—during the operation for attaching the embedment member 10.

After the embedment member 10 is attached to the core 3, the formation of a seat pad is conducted by foaming resin in the same manner as the aforementioned case. After the resin foam is cured, the mold is opened and the foamed resin article is released from the mold. Therefore, a seat pad 90 in which a seat pad body 91 composed of the foamed resin article and the embedment member 10 are integrated is formed. The seat pad body 91 is provided with marks 81, 82 composed of convexities which are formed by the concavities 81A, 82A.

The position of the embedment member 10 of the seat pad 90 released from the mold is checked with regard to the marks 71, 72 and the marks 81, 82. It is judged as acceptance when the marks 71, 72 are in the width ranges of the marks 81, 82, while it is judged as rejection when the marks 71, 72 are out of the width ranges of the marks 81, 82. By comparing the marks 71, 72 to the marks 81, 82, the position of the embedment member 10 can be checked in perpendicular two directions so as to provide excellent accuracy of judgment.

The aforementioned embodiment is an example of the present invention. The present invention may be adopted to another embodiment other than the illustrated embodiment. For example, though the mark 82 may be formed at the side opposite to the position shown in FIG. 13b about the embedment member 10. The marks 81, 82 may be formed on three or four sides of the embedment member 10. The marks 81, 82 may be concavities formed in the surface of the seat pad body 91.

Though the line width of the marks 71, 72 is small and the width of the marks 81, 82 is large in the aforementioned embodiment, the marks 81, 82 may have small width and the marks 71, 72 may have large width.

As described in the above, the fifth aspect enables proper checking whether the position of the embedment member of the foamed resin article with the embedment member is in the acceptable range.

What is claimed is:

1. An embedment member that attaches to an inner surface of a mold for forming a seat pad by foaming and to be integrated with the resin foam when a resin material is foamed in the mold, wherein
said embedment member is provided with a concave portion that engages with an engaging projection formed on the inner surface of the mold to hold the embedment member to the inner surface of the mold, wherein the concave portion is provided at a first exterior face of the embedment member, said first exterior face being planar in the vicinity of the concave portion,
said engaging projection has a thin leg and an enlarged head, and
said concave portion has a narrow portion to be engaged with the leg, a wide portion to be engaged with the head, and a passage portion for the passage of the head,
wherein, the wide portion is positioned behind the narrow portion with respect to the planar first exterior face of the embedment member, such that the wide portion is provided at an interior of the embedment member, wherein both the narrow portion and the passage portion open directly from the planar first exterior face of the embedment member, wherein said narrow portion and said wide portion extend linearly from the passage portion toward a front side of the seat pad, wherein an outer periphery of each of the narrow portion and the passage portion is entirely enclosed by the planar first exterior face of the embedment member, and wherein the narrow portion is narrower than the passage portion.

2. An embedment member as claimed in claim 1, wherein said concave portion has a large opening portion as said passage portion which is larger than said head, and said narrow portion and said wide portion extend from the large opening portion.

3. An embedment member as claimed in claim 2, wherein the large opening portion has a taper portion in which the width is gradually reduced toward the narrow portion and the wide portion.

4. An embedment member as claimed in claim 3, wherein said narrow portion and said wide portion linearly extend from the large opening portion.

5. An embedment member as claimed in claim 4, wherein a plurality of said concave portions are provided and are positioned such that the directions in which the narrow portions and the wide portions extend from the large opening portions of the respective concave portions lie on a straight line and are the same as each other.

6. An embedment member as claimed in claim 4, wherein a plurality of said concave portions are provided and are positioned such that the directions in which the narrow portions and the wide portions extend from the large opening portions of the respective concave portions are parallel to each other and the same as each other.

* * * * *